Patented Feb. 21, 1950

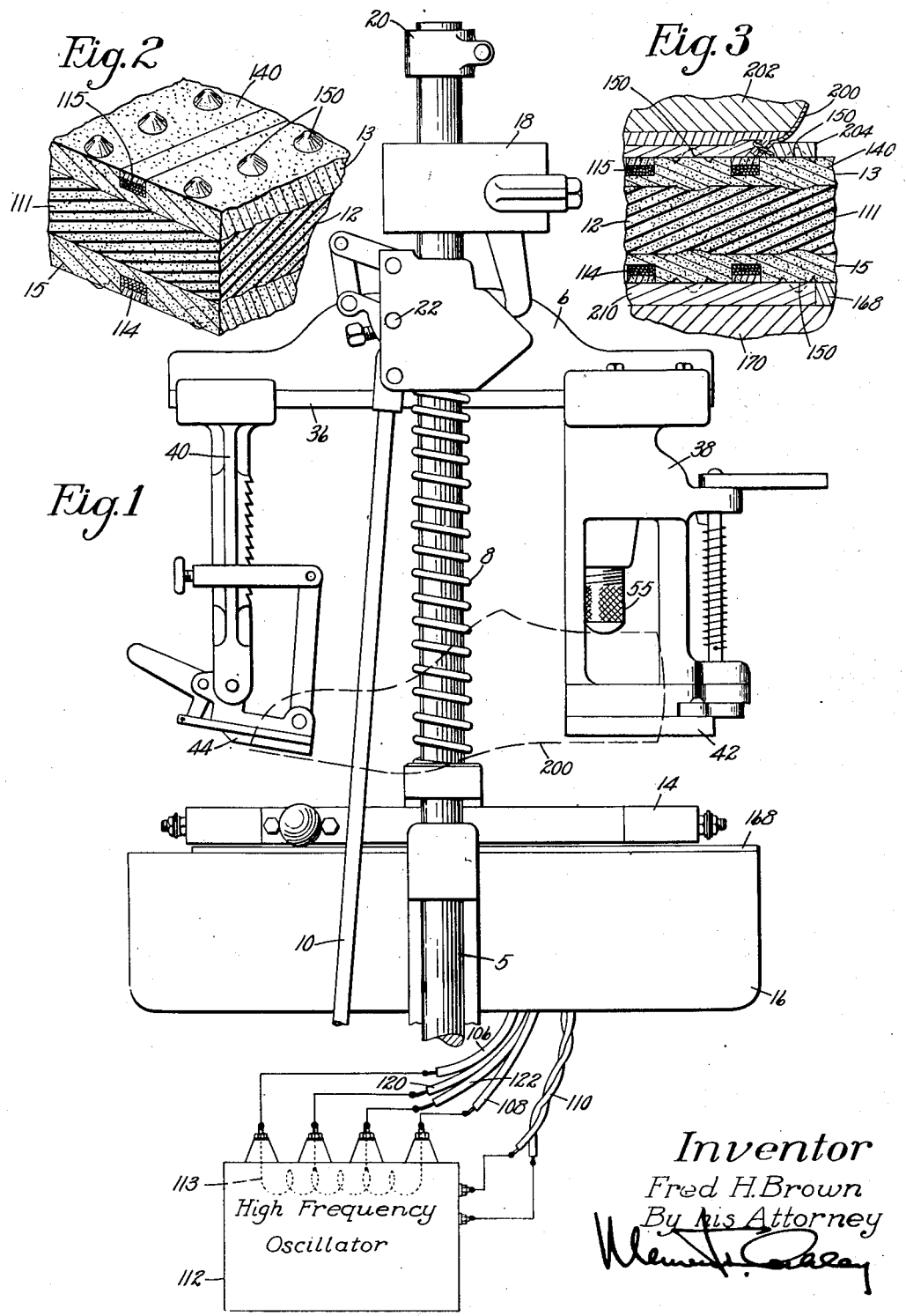

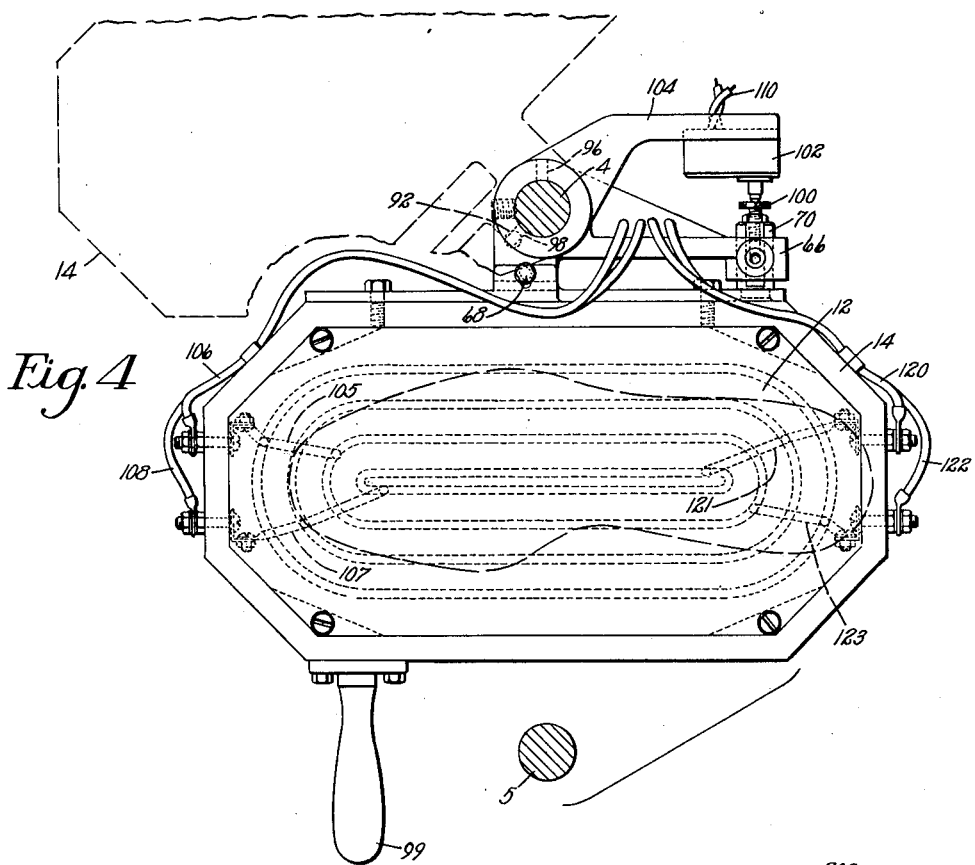
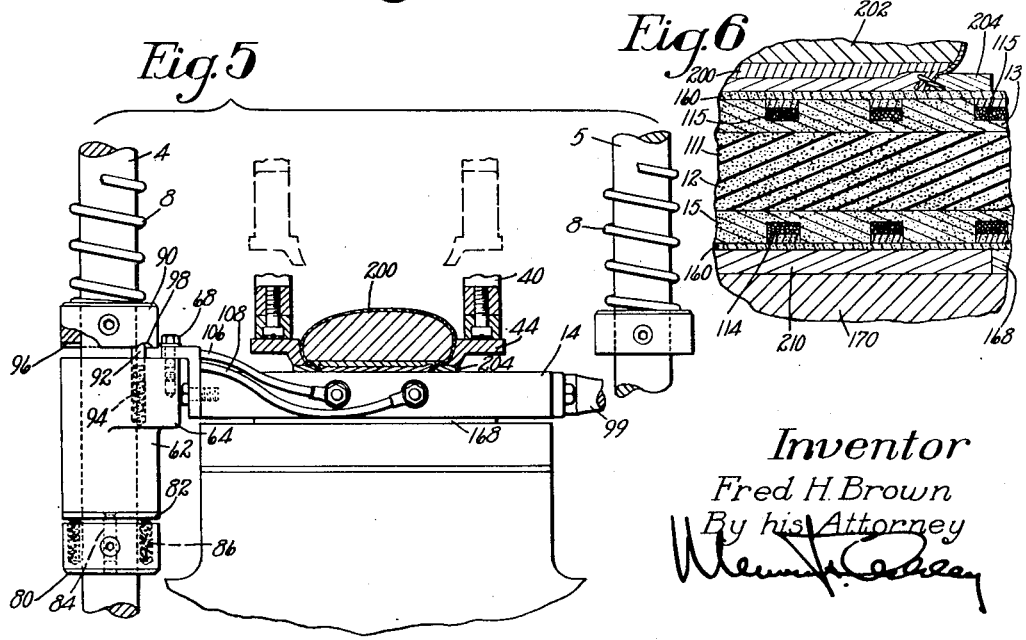

2,498,027

UNITED STATES PATENT OFFICE 2,498,027

MACHINE AND METHOD FOR THERMOACTIVE ADHESIVE BONDING OF SHOE PARTS

Fred H. Brown, Beverly, Mass., assignor to United Shoe Machinery Corporation, Flemington, N. J., a corporation of New Jersey Application May 15, 1947, Serial No. 748,213

11 Claims. (Cl. 12—33)

This invention relates to a method of manufacturing compound articles from smaller units by adhesively joining such smaller units. More particularly, it relates to a method and apparatus for manufacturing shoes by activating a thermoactive adhesive coating on shoe parts by means of an electrode member held between such parts and thereafter pressing such parts together in the desired position.

The invention is herein illustrated as applied to a machine of the type disclosed in United States Letters Patent No. 1,142,557, granted June 8, 1915, on an application filed in the name of Karl Engel, this machine being particularly adapted for locating and temporarily holding in desired relation to each other, parts of boots or shoes. It is to be understood that in its more general aspects this invention is not limited to use in machines of that particular character nor to the manufacture of shoes.

Ordinarily, the adhesive joining of shoe parts by thermoactive adhesive is accomplished by coating one or both attaching surfaces of such parts with such adhesive, allowing such coatings to dry, pressing the parts together and activating the adhesive by means of externally applied heat or by high-frequency electric fields derived from external electrodes. In some cases activation precedes the bringing of the parts together. Since, in many of such methods, the activating means must work through the thickness of at least one of the parts to be joined, their success is limited by considerations involving the thickness of the work material, the danger of burning the material and the time consumed in activating the coating.

It is accordingly an object of the present invention to provide a method of adhesively joining shoe parts whereby thermoactive adhesive coatings upon the attaching surfaces of such parts are activated throughout by means which itself does not require to be heated and is not required to work through the thickness of a layer of material.

Where the shoe parts are to be bonded in a flexed condition, advantageously the parts may be tempered or softened prior to the bonding to reduce the tendency of the parts to "fight back" and weaken the bond. One method of tempering such parts is by the application of gentle heat thereto. Advantageously this heat could be supplied at the time the bonding adhesive is activated. This is not, however, feasible with present methods and apparatus which are not adapted to produce the requisite heat distribution in the adhesive and the shoe parts, or which might cause localized overheating if so used.

Hence, an object of the invention is the provision of a method of and apparatus for adhesively joining shoe parts in which, by the distributed field of a stray-field electrode, the adhesive is activated and simultaneously therewith the parts are tempered or softened to provide upon subsequent joining of the flexed parts under pressure a tempered bond in which the parts have little tendency to "fight back" and weaken the bond.

In the adhesive bonding of parts with high-frequency electric energy, particular circumstances may make it desirable to provide between such parts a particular distribution of the total applied high-frequency electric energy. For example, in the adhesive joining of two flat surfaces, such distribution would normally be uniform between the surfaces to achieve equal activation. On the other hand, in the adhesive joining of a shoe and a sole, it is advantageous in certain cases to apply more energy to the sole than to the shoe. One case is where the high-frequency energy is additionally employed for the purpose of tempering the sole during the activation period so that it will mold readily to the shoe. In this case, less energy need be applied to the shoe since the sole will provide a reservoir of heat to insure proper coalescense of the bond upon the sequential compression of the parts. Furnishing less heat to the shoe has the advantage of avoiding unduly prolonging the dwell time.

Accordingly, another object of the invention is to provide a method of adhesively joining shoe parts bearing coatings of thermoactive adhesive whereby during the period of activation such parts are exposed to high-frequency electric fields of unequal strength.

From another aspect, the present invention provides a method of adhesively joining shoe parts wherein the parts to be joined are supported in spaced relation and thermoactive adhesive coatings on the parts are selectively activated by a high-frequency electric field generated by a stray-field electrode member which is inserted between the parts and withdrawn, after activation of the coatings, to permit the parts to be immediately pressed together in the desired relation.

It is another object of this invention to provide improved apparatus for carrying out the method of the invention. Advantageously this joining may be effected, in accordance with a feature of the invention, by a machine having shoe parts positioning and manipulating mechanism and an electrode member arranged to set up a stray field through the adhesive coating on such parts to activate such coating. To this end the illustrated machine is provided, in addition to means for supporting the shoe parts and means for pressing such parts together, with means for supporting a stray-field electrode member so that it may readily be introduced between the supported shoe parts and means for independently supplying upper electrodes and lower electrodes of such electrode member with high-frequency electric energy when the electrode member is in position for activating the adhesive coatings.

By "stray-field" electrode member is meant a combination of cooperating electrodes arranged in a doublet type system wherein the members of any adjacent pair are connected to opposite poles of the source of high-frequency electric energy, said member being adapted for producing an electric field external of the space between said electrodes.

More specifically, in the adhesive bonding of a sole to a shoe by means of the illustrated machine, a shoe and a sole each bearing upon its attaching margin a coating of thermoactive adhesive previously applied and dried are positioned on their respective supports. By these supports the shoe and sole are held in heightwise spaced and horizontally registering position. The stray-field electrode member on its carriage is then swung into a position in which it is disposed between shoe and sole thereby actuating a switching means for energizing the electrode member. At this time, upon pressure by the operator upon a treadle, the shoe is made to press down upon the electrode member.

In accordance with another feature of the invention, the electrode member is mounted to yield heightwise in its carriage, upon engagement thereof by one shoe part, whereupon it may move against the associated shoe part for maximum activation of the cement layers. At the close of the activation period, pressure upon the shoe parts is released, releasing the electrode member to permit it to be swung out of the space between shoe and sole thereby actuating switching means to turn off the power supplied to it. The shoe and sole are then pressed together, upon a second pressure upon the treadle.

In accordance with yet another feature of the invention, to assist the release of the electrode member upon removal of pressure, the electrode pad is provided with yielding conical projections which are compressed with the pressure of the shoe parts upon the pad to merge with the flat surface of the pad but which tend to spring back upon release of the pressure, thus counteracting any tendency on the part of the electrode pad to stick to the attaching surfaces. Alternatively as shown, the electrode pad may be covered with a non-sticking material such as tetrafluoroethylene polymer.

While the embodiment illustrated applies to a method of adhesively joining a shoe and a sole, the method may be advantageously applied to joining a plurality of heavy units to form a structure such as a heavy beam since the activating means does not operate through the thickness of the work. Thus in another aspect, the invention finds expression in a novel method of making structures composed of units adhesively joined together. Other analogous applications of this method will readily occur to those skilled in the art.

These and other features of the invention are described in detail in the following specification in connection with the accompanying drawings and are pointed out in the appended claims.

In the drawings:

Fig. 1 is a side elevation of the work parts supporting and manipulating portion of a machine embodying the invention;

Fig. 2 is a perspective view of a section of the electrode member showing as one embodiment of a feature of the invention electrode pad releasing means comprising spaced yielding conical projections on the surface of such pad;

Fig. 3 is a sectional view through the electrode member and such projections illustrating the position of such projections under pressure of a flat surface such as a sole;

Fig. 4 is a plan view of the electrode member and its supporting means and shows switching means to control the supply of power;

Fig. 5 is a front view of the electrode carriage and its supporting members with the shoe supporting members and the toe-end of the shoe in section and positioned as such elements are disposed during activation of adhesive coatings on such parts; and Fig. 6 is a sectional view through the electrode member illustrating yet another embodiment of the pad releasing means comprising a layer of non-adhering, low-loss, low dielectric coefficient, non-conductive material between the pad and the shoe parts.

The illustrated machine is arranged to support a shoe 200 on a last 202 and a sole 210 in heightwise spaced relation, to yieldingly and swingably support a stray-field electrode member 12 in its carriage 14 between the shoe and the sole and to provide means whereby the shoe 200 with its welt 204 and the sole 210 may be pressed together in proper relation. To this end the machine, like that of the above-mentioned Engel patent, is provided, as shown in Fig. 1, with a base (not shown), vertical guide rods 4 and 5 supported by said base, and a crosshead 6, movable on said guide rods, and supported on springs 8 which tend to keep it normally in its uppermost position. Rods 10 are connected to a treadle (not shown) for depressing the crosshead 6 to bring the shoe held by the shoe-supporting mechanism carried by such head down into contact with an electrode member 12 (Fig. 4) carried in a displaceable electrode carriage 14 or, when said carriage has been withdrawn from between the shoe parts, with a sole on a pad 170 (Fig. 3) in the pad holder or frame 16. The crosshead is further provided with clutch collars 18 for locking the crosshead in its depressed position, and with stop collars 20 for limiting the upward movement of the crosshead, as well as with mechanism actuated by a handle connected to a rockshaft 22 for releasing the clutch collars 18.

Carried upon flanges or guides 36 upon the crosshead are supports 38 and 40 for shoe-supporting jaws 42 and 44 respectively, the jaws 42 being constructed to support the heel end of the shoe and the jaws 44 being constructed to support the toe end. An abutment 55 engages the crown of the last. The pad holder 16 is provided with sole-positioning members 168 (Fig. 3) serving to maintain a sole in proper horizontal register with a shoe in the jaws 42, 44.

Figs. 4 and 5 illustrate the electrode carriage 14 and its pivoting and yielding supporting means. These comprise a sleeve 62 adapted to turn about guide rod 4 and supported by washer 82 which is movable heightwise but held from turning by pin 84 slidably engaging a heightwise hole in collar 80 which yieldingly supports washer 82 on springs 86, thereby tending to keep sleeve 62 normally in its uppermost position.

Integral with sleeve 62 are a lug 64 and an arm 66 to which the electrode carriage 14 is secured by a bolt 68 and a stud 70 respectively. Upward movement of sleeve 62 is limited by a collar 90, bearing an arm 104 and provided on its bottom with index slots 96 and 98. The slot 96 is yieldably engaged, when the carriage is withdrawn, by a pin 92 urged heightwise by a spring 94. Slot 98 is similarly engaged when, as in Fig. 4, the carriage has been swung manually by a handle 99 into position between shoe and sole. In the latter position, a thumb screw 100 in stud 70 closes a normally open switch 102 mounted on the arm 104 to effect, through leads 110, the connection of a supply of power to a high-frequency oscillator 112 (Fig. 1) which, from taps on its tank coil 113, then energizes the lower electrodes 114 in the electrode member 12 through leads 106, 108 and conductors 105, 107 and energizes the upper electrodes 115 in said member through leads 120, 122 and conductors 121, 123. The lower electrodes 114 comprise an electrode 15 of the type disclosed in United States Letters Patent No. 2,412,982 granted December 24, 1946, upon an application in the name of George Hart. The upper electrodes 115 comprise another similar electrode 13, the two electrodes being attached in back-to-back relation respectively to the top and bottom surface of a supporting pad 111, and as shown above being adapted to be independently supplied with high-frequency electric power at selectable voltage or frequency. The energy of the high frequency electric power supplied to the electrodes, that is, the capacity of such power to heat the work parts, is a function of the frequency and the voltage of such power. I have shown in Fig. 1 how high-frequency power of different voltages may be supplied to the two electrodes. It may be understood that by connecting leads 120 and 122 to the tank coil of another oscillator of different frequency such power may be supplied to the two electrodes at different frequencies.

Heating of the work parts by the stray-field electrode member is accomplished herein by means of the high-frequency electric field generated by the member rather than by conduction or radiation of heat from the member. Accordingly, when I employ the word "unheated" to describe the member, I mean thereby that the member is not heated for the production of heat, although incidental heating of the member, as by conduction from a heated sole, may occur.

Fig. 2 shows in one embodiment of the invention means for preventing electrode pad 140 from sticking to adhesive coatings on the work parts. In this embodiment compressible conical projections 150 tend to hold the work from the surface of the pad and counteract sticking. Fig. 3 shows in section these projections under the pressure of a shoe 200 and a sole 210. In another embodiment shown in Fig. 6, a thin layer of polytetrafluoroethylene 160 over the electrode pad is utilized to prevent sticking since, as it is well-known, the usual thermoplastic adhesives will not stick to this substance.

In attaching a sole to a shoe by the method of this invention, starting with the electrode carriage 14 in the withdrawn position the operator positions a lasted shoe 200 between the clamping jaws 42 and 44 and adjusts abutment 55 so that it bears against the crown of the last.

A sole is placed upon the pad in frame 16 where it is held by positioning members 168 in register with the shoe, that is, in such a position that when the shoe is later brought down upon it the parts will meet in the correct position. Preferably, both shoe and sole have upon their attaching surfaces a previously applied and dried coating of the thermoactive adhesive. The electrode member is now swung into position between the shoe parts and as the power switch 102 is engaged by thumb screw 100 the operator, by pressure on the treadle, brings the shoe down upon the electrode member pressing it against the sole. While switch 102 is thus engaged, high-frequency alternating current is supplied to the electrode member producing a high-frequency electric field which permeates the surrounding area and material. Application of the field immediately generates dielectric heat in the sole to raise its temperature, the same field similarly activating the adhesive by dielectric heat produced therein.

At the end of the activating period the operator releases pressure on the treadle lifting the shoe whereupon the electrode member is urged upward and released from the sole by the pressure of the springs 86 aided in one embodiment of the invention by the expansion of the compressible conical projections 150 (Fig. 2) in the electrode pad. Upon such release the electrode member is swung laterally from the space between shoe and sole, this movement switching off the heating power, and the operator by a second pressure on the treadle brings the shoe down upon the sole to join the parts by means of the now activated adhesive.

Having thus described my invention, what I claim as new and desire to secure by Letters Patent of the United States is:

1. In combination, separable supports for holding in predetermined contacting relation shoe parts at least one of which bears upon its contacting surface a previously applied and dried coating of thermoactive adhesive, an electrode carriage, said carriage being movably supported for the introduction thereof between said separable supports and for reactively yielding upon the application of pressure upon said carriage from at least one of said separable supports, an unheated stray-field electrode member on said carriage adapted to be supplied with high-frequency electric power for activating the cement coatings by means of the dielectric heat generated by fields set up by said power, means for supplying such power, and means for moving said separable supports relatively toward or away from each other.

2. In combination, separable supports for holding in predetermined contacting relation shoe parts, at least one of which bears upon its contacting surface a previously applied and dried coating of thermoactive adhesive, an electrode carriage, said carriage being movably supported for the introduction thereof between said separable supports and for reactively yielding movement upon the application of pressure upon said carriage from at least one of said separable supports, a resilient pad on said carriage, the surface of which pad is provided with spaced projections adapted to be compressed into such pad during activation pressure and adapted upon the release of such pressure to hold the shoe part mounted on at least one of the separable supports from contact with the surface of the pad, an unheated stray-field electrode member in said pad adapted to be supplied with high-frequency electric power for activating the cement coatings by means of the dielecertic heat generated by the field set up by said power, and means for moving said separable supports relatively toward or away from each other.

3. In apparatus for the adhesive joining of parts by means of a thermoactive adhesive, an activating element to which the usual thermoactive adhesive will not stick, comprising a stray-field electrode member in a flexible pad, the surfaces of said pad adjacent to the parts to be heated being provided with a thin layer of a non-adhering plastic of low-loss, low-dielectric constant characteristics.

4. Apparatus as in claim 3 in which the non-adhering plastic is polytetrafluoroethylene.

5. In combination, a shoe support, a sole support, one of said supports being movable from a position where the parts occupy a predetermined registering relation to a position separated therefrom, an unheated stray-field electrode member mounted for movement from an outside position to a position between said shoe parts, means for supplying high-frequency electric power to said member to set up a dielectric field adjacent thereto to activate a previously applied and dried coating of thermoplastic cement upon one of said parts, means responsive to the movement of said member for controlling the supply of power thereto, and means for moving one of the work supports to bring the parts together in predetermined relation after the cement has been activated.

6. In apparatus of the class described, two supports for parts to be adhesively joined, one of said supports being movable along a defined path from a position where said parts are in contact in predetermined relation to a position separated therefrom, an unheated stray-field electrode member comprising doublet electrodes mounted in a flexible pad, said member being movable from a position out of the path of movement of the movable support into position adjacent to one of said parts, and means for supplying high-frequency electric power to said member to heat chiefly a previously applied and dried coating of thermoactive adhesive on at least one part without heating the electrode member.

7. Apparatus as in claim 5 in which the stray-field electrode member comprises two sets of doublet electrodes, one set on either side of a flexible pad and each set being adapted to be independently supplied with high-frequency electric energy.

8. That improvement in methods of attaching soles to shoes which comprises supporting a shoe, supporting a sole in predetermined registering position and spaced therefrom, said shoe and sole having upon their contacting surfaces previously applied and dried coatings of thermoactive adhesive, inserting between said shoe and sole an unheated stray-field electrode member having top surface and bottom surface doublet electrodes adapted to be independently supplied with high-frequency electric power, supplying such power to the electrodes adjacent to the sole at different energy than to the other electrodes, to activate the adhesive coatings and heat the sole, removing said member and pressing the shoe and sole together without disturbing their register.

9. Method as in claim 8 in which the high-frequency electric power is supplied to the electrodes adjacent to the sole at higher frequency than to the other electrodes.

10. Method as in claim 8 in which the high-frequency electric power is supplied to the electrodes adjacent to the sole at higher voltage than to the other electrodes.

11. Method as in claim 8 in which the high-frequency electric power is supplied to the electrodes adjacent to the sole at higher energy than to the other electrodes.

FRED H. BROWN.

REFERENCES CITED

The following references are of record in the file of this patent:

UNITED STATES PATENTS

| Number | Name | Date |
|---|---|---|
| 2,212,522 | Hart et al. | Aug. 27, 1940 |
| 2,342,725 | Crepeau | Feb. 29, 1944 |
| 2,386,902 | Knowlton | Oct. 16, 1945 |
| 2,412,982 | Hart | Dec. 24, 1946 |